US010035712B2

(12) United States Patent
Azam et al.

(10) Patent No.: US 10,035,712 B2
(45) Date of Patent: Jul. 31, 2018

(54) METHOD FOR PRODUCING WATER DISPERSIBLE CUO NANOSTRUCTURES

(71) Applicant: KING ABDULAZIZ UNIVERSITY, Jeddah (SA)

(72) Inventors: Ameer Azam, Jeddah (SA); Attieh A. Al-Ghamdi, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 411 days.

(21) Appl. No.: 14/846,702

(22) Filed: Sep. 4, 2015

(65) Prior Publication Data
US 2017/0066657 A1   Mar. 9, 2017

(51) Int. Cl.
C01G 3/02   (2006.01)

(52) U.S. Cl.
CPC ............ *C01G 3/02* (2013.01); *C01P 2002/72* (2013.01); *C01P 2002/84* (2013.01); *C01P 2002/85* (2013.01); *C01P 2004/03* (2013.01); *C01P 2004/10* (2013.01); *C01P 2004/61* (2013.01); *C01P 2004/62* (2013.01)

(58) Field of Classification Search
CPC ............ C01P 2004/62; C01P 2004/03; C01P 2004/10; C01P 2004/61; C01P 2002/72; C01P 2002/84; C01P 2002/85; C01G 3/02
See application file for complete search history.

(56) References Cited

U.S. PATENT DOCUMENTS

| 4,250,111 A * | 2/1981 | Seale ............... B01J 37/03 502/131 |
| 8,318,126 B2 | 11/2012 | Wong et al. |
| 2007/0014711 A1 | 1/2007 | Deevi et al. |
| 2013/0281287 A1 | 10/2013 | Woelk et al. |

OTHER PUBLICATIONS

Sun et al: NPL: Synthesis and characterization of CuO nanoparticles from liquid ammoinia, Materials research bulletin, vol. 40, issue 6, 2005, pp. 1024-1027.*
Charoonsuk et al : NPL: Sonochemical synthsis and characterization of copper oxide nanoparticles, Energy procedia, 9, 2011, pp. 404-409.*
Deng et al., "One Pot Sonochemical Fabrication of Hierarchial Hollow CuO Submicrospheres", Ultrasonics Sonochemistry, 18(5), 932-937, 2011.
Ranjbar-Karimi et al., "Sonochemical Synthesis, Characterization and Thermal and Optical Analysis of CuO Nanoparticles", Physica B: Condensed Matter, 405(15), 3096-3100, 2010.
Zhu et al., "Ultrasound Assisted Template-Free Synthesis of $Cu(OH)_2$ and Hierarchial Cuo Nanowires From $Cu_2Cl_4(OH)_{10}H_2O$", Materials Letters, 64 (8) , 976-979, 2010.

* cited by examiner

Primary Examiner — Melvin C. Mayes
Assistant Examiner — Smita S Patel
(74) Attorney, Agent, or Firm — Richard C. Litman

(57) ABSTRACT

A method for producing water dispersible CuO nanostructures includes mixing copper nitrate with an ammonia solution. The copper nitrate and ammonia solution can be treated with ultrasound at room temperature. The water dispersible CuO nanostructures can be produced without any surfactant.

6 Claims, 7 Drawing Sheets

METHOD FOR PRODUCING WATER DISPERSIBLE CUO NANOSTRUCTURES

BACKGROUND OF THE INVENTION

1. Field of the Invention

The present invention relates to CuO nanostructures, and particularly to a method for producing water dispersible CuO nanostructures.

2. Description of the Related Art

Copper oxide (CuO) is a widely-used, environmentally friendly, and nontoxic material. Copper is an abundant metal. CuO is one of the earliest semiconductor materials investigated for solar cells in the early 1900's before silicon cells became widespread. It is a p-type semiconductor, having monoclinic structure. The energy band gap of CuO ranges between 1.2-1.9 eV and a number of fascinating properties are exhibited by nanostructural CuO. Therefore, it is a promising material in applications including photo-electrochemical materials, high $T_c$ superconductors, lithium ion electrode, gas sensors, biosensors, solar cells, field emission emitters, catalysts, antibacterial agents, etc.

Nanocrystalline CuO have been prepared using various methods, such as sol-gel method, one-step solid state reaction method, electrochemical method, and thermal decomposition of precursors. CuO nanoparticles prepared using these methods are not easily dispersible in water. There are various applications where water soluble good dispersion of CuO is required.

Thus, a method for producing water dispersible CuO nanostructures solving the aforementioned problems is desired.

SUMMARY OF THE INVENTION

A method for producing water dispersible CuO nanostructures includes placing a copper nitrate solution in an ultrasonic bath. Ammonia solution ($NH_4OH$) is added to the copper nitrate solution to form a precipitate. The precipitate is placed in the ultrasonic bath again to form a black precipitate. The black precipitate is washed in water and/or ethanol, then dried in an oven at about 80° C. for about 24 hours to form a CuO nano powder.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
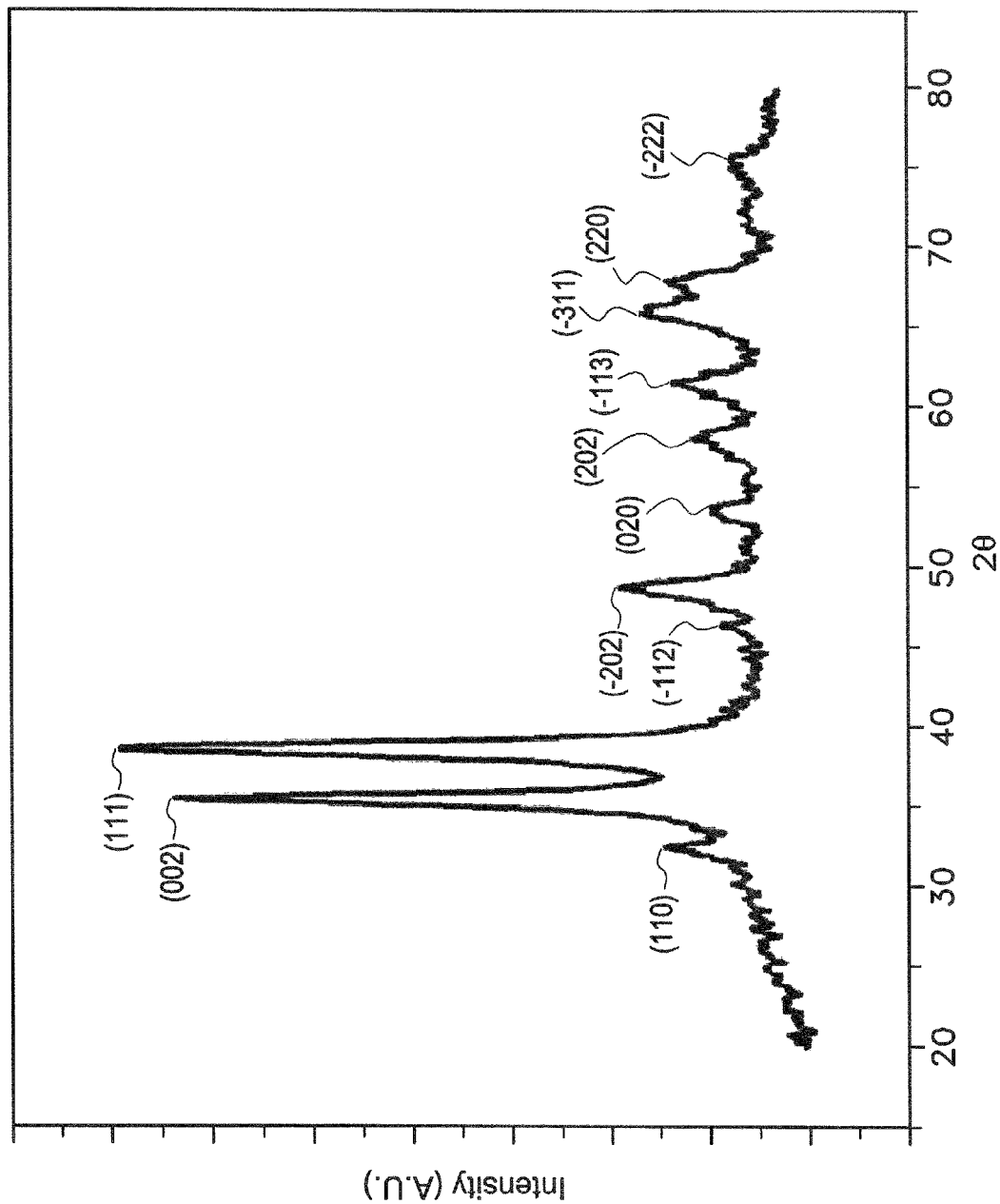
FIG. 1 is an XRD of CuO nanopowder.

A method for producing water dispersible CuO nanostructures includes mixing copper nitrate solution with an ammonia solution ($NH_4OH$). The copper nitrate and ammonia solution can be treated with ultrasound at room temperature. The water dispersible CuO nanostructures can be produced without any surfactant. The method is novel, simple, cost-effective and can be utilized for large scale production of water dispersible CuO nanostructures.

The nanostructures can have a minimum thickness of about 26.7 nm and a maximum thickness of about 54.4 nm. The nanostructures can have a minimum length of about 89.3 nm and a maximum length of about 194.0 nm. The nanostructures can be spindle-shaped. The nanostructures can have good dispersion in water.

To prepare the CuO nanostructures, about 0.01 M to about 0.05 M copper nitrate can be dissolved in about 100 ml deionized water ($Cu(NO_3)_2.3H_2O$). The solution can be placed in an ultrasonic bath for about 30 minutes. About 1 mL to about 4 mL of $NH_4OH$ can be added to the solution to form a precipitate. A pH of the precipitate can be adjusted to a level between about 9 to about 12. The precipitate can be placed in the ultrasonic bath again for about 30 minutes to form a black precipitate. The black precipitate can be collected, and washed in water and/or ethanol, e.g., by using a centrifuge at 3000 rpm for 15 minutes. The precipitate can be dried in an oven at about 80° C. for about 24 hours to form a CuO nano powder.

The present method includes sonochemical synthesis of CuO nanostructures. Sonochemical synthesis is a promising method for the preparation of various nanomaterials, and employs the application of ultrasound to chemical reactions and processes. This technique exploits the phenomenon of acoustic cavitation for synthesis. Acoustic cavitation is the continuous formation, growth and drastic collapse of bubbles in solution as a result of application of ultrasound radiation. When the container with the solution is put in an ultrasound reactor, high temperature (>5000 K), high pressure (>20 M Pa) and high cooling rate ($10^{10}$ K S$^{-1}$) are geneaced in the collapse of bubbles, accompanied with intense shock wave and microjet (400 Km/h). Prior methods for synthesizing CuO nanostructures differ from the present method. For example, Deng et al. synthesized the hierarchical CuO hollow submicron-sized spheres by the sonochemical technique with urea as alkali and the decomposition of $CO_2$ as a template. Wongpisutpaisan et al. used copper nitrate, sodium hydroxide and PVA as starting materials for synthesizing CuO nanoparticles by sonochemical method. Pendashteh et al. reported the morphologically controlled preparation of CuO nanostructures under ultrasound irradiation using copper nitrate and NaOH as starting materials.

The CuO nano powder or nanostructures can be used in a variety of applications, including photo-electrochemical materials, high $T_c$ superconductors, lithium ion electrode, gas sensors, biosensors, solar cells, field emission emitters, catalysts, and antibacterial agents.

The following example illustrates the present teachings.

Example

High purity chemicals were received without further purification. 0.02 M copper nitrate ($Cu(NO_3)_2.3H_2O$) was properly dissolved in 100 ml deionized water in a beaker. The beaker was kept in an Ultrasonic bath for about 30 minutes. Subsequently 1-4 ml $NH_4OH$ was added in the solution drop wise resulting in the formation of precipitate. The pH of the solution was adjusted to 9. The beaker was again kept in the Ultrasonic bath for about 30 minutes converting the precipitate into black precipitate. This black precipitate was collected and washed 3 times in water and 3 times in ethanol using a Centrifuge at 3000 rpm for 15 minutes. Finally, the precipitate was dried in an oven at 80° C. for 24 h resulting in the formation of CuO nano powder.

The CuO nano powder so obtained was investigated using XRD, FESEM, UV-Vis, PL spectroscopy and XPS.

Structural characterization was carried out by X-ray diffraction (XRD) using Rigaku X-ray diffractometer (ULTIMA IV) with Cu-Kα radiation having wavelength $\lambda=1.5406\text{Å}$ in the 2θ range from 20° to 80° C. Morphological analysis was carried out on a FESEM (JEOL, JSM-7600F). The compositional analysis of the synthesized nanoparticles was studied using energy dispersive spectroscopy (EDS) (Oxford Instruments) attached with FESEM. Optical absorbance spectra were taken using Perkin Elmer UV-Visible spectrophotometer at room temperature. Fluorescent emission spectra were recorded on a Shimadzu Florescence spectrophotometer. An XPS spectrum was recorded on ULVAC-PHI X-ray photoelectron spectrometer (PHI 5000 VersaProbell).

FIG. 1 shows the typical XRD spectrum of CuO nanopowder. The peak positions exhibit the monoclinic structure of CuO which was confirmed from the ICDD card No. 01-089-2529. Absence of impurity peak in the XRD pattern shows the high purity of the obtained nanopowder. Sharp diffraction peaks show the good crystallinity of the CuO nanopowder. The broadening of the peaks indicates that the obtained CuO nanostructures are in nanometer range which was further confirmed by FESEM images.

Figure 2A:
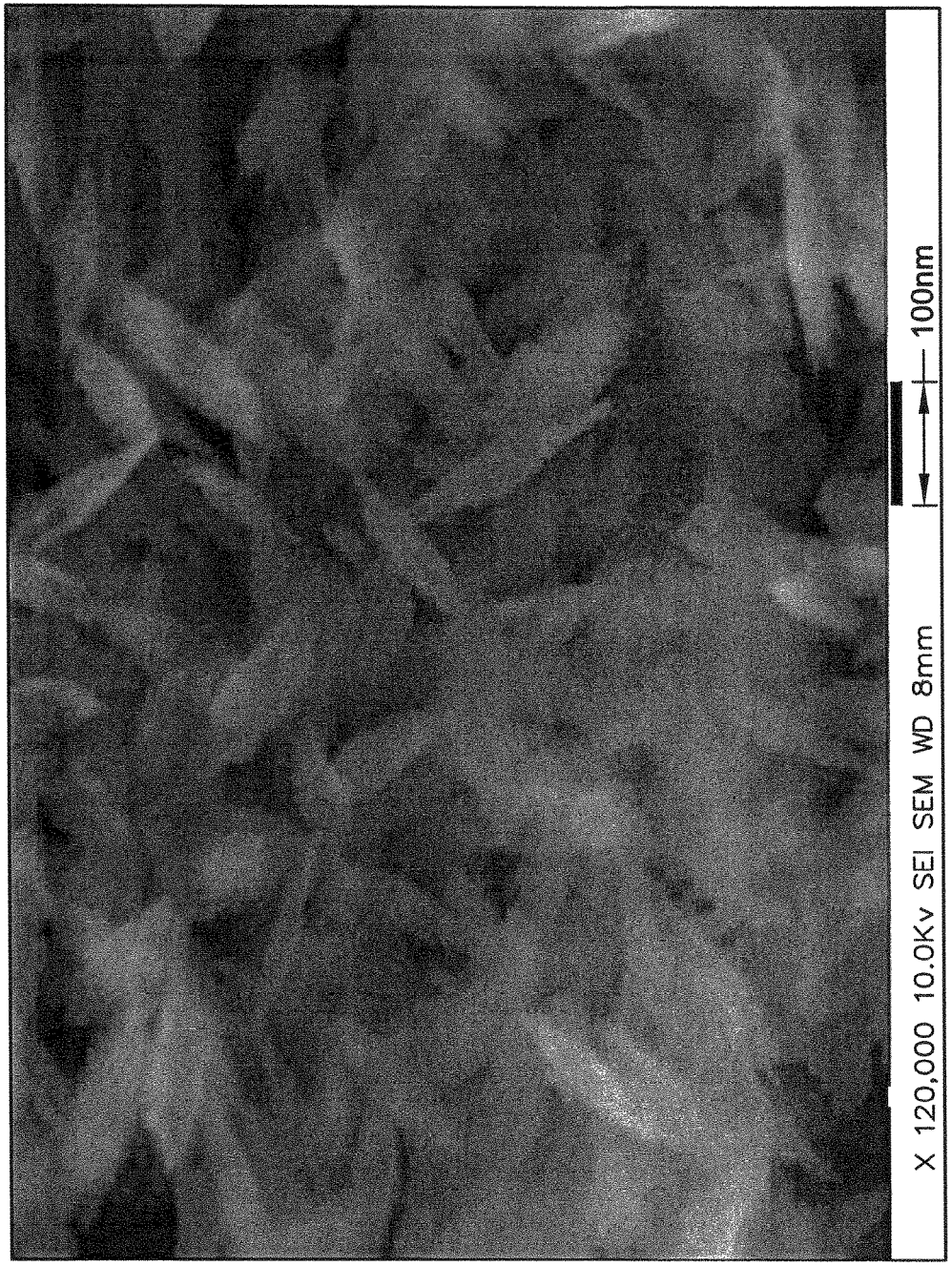
FIG. 2A is an FESEM image of CuO nanopowder.
Figure 2B:
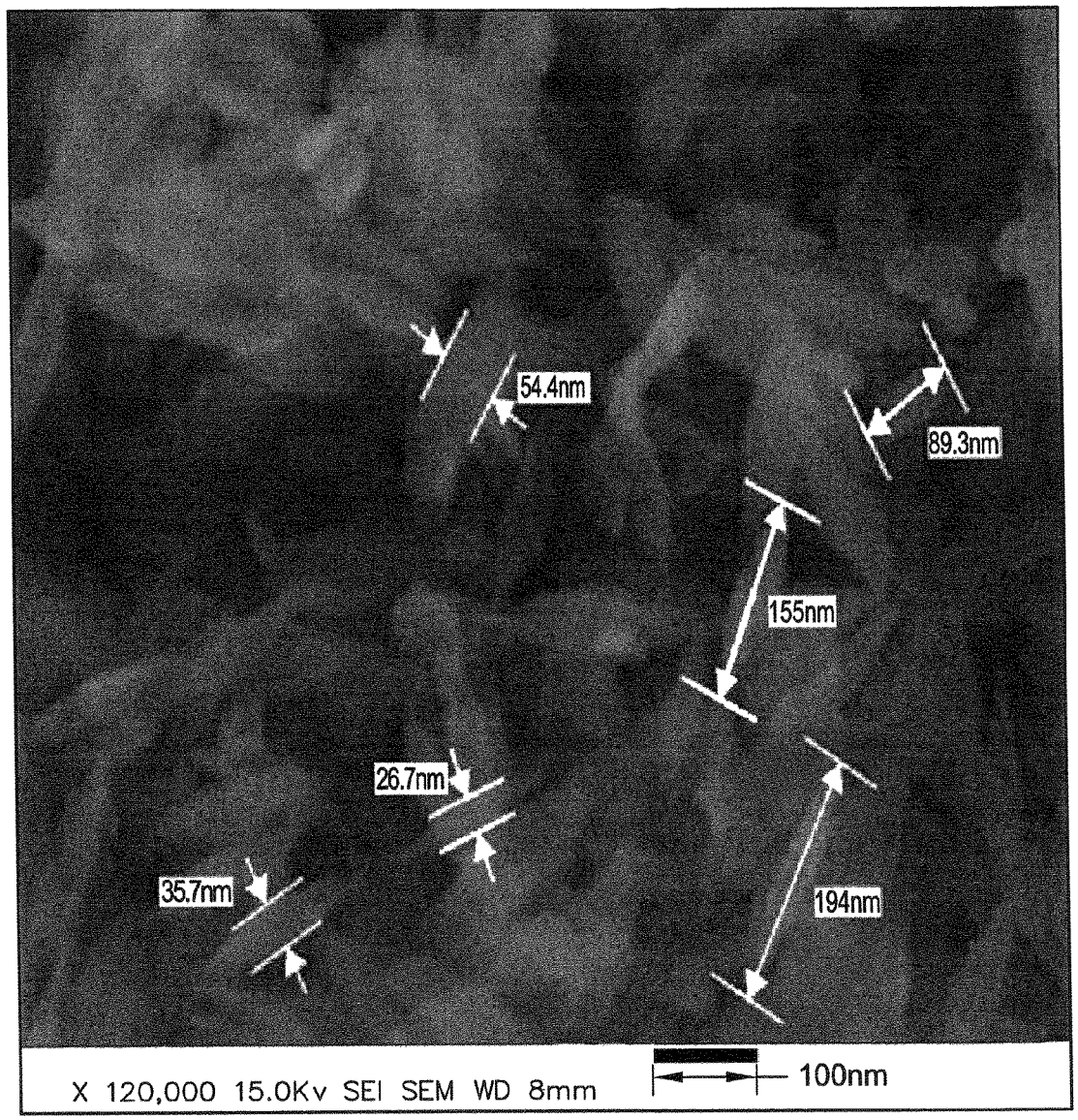
FIG. 2B is an FESEM image of CuO nanopowder.
Figure 3:
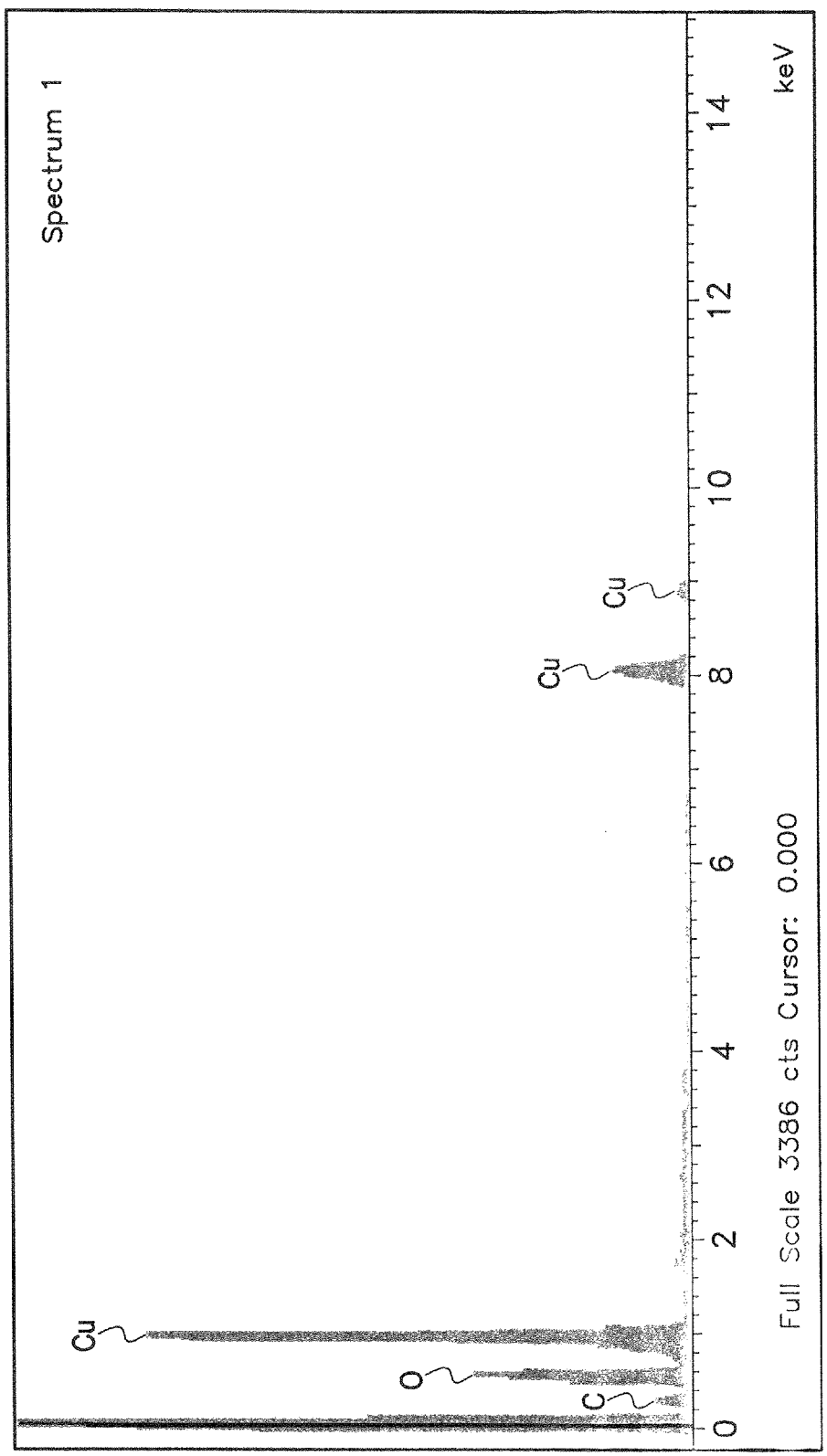
FIG. 3 is EDAX of CuO nanopowder.

FIGS. 2A-2B show the typical morphology of CuO nanopowder. Powder was stuck on the sample holder using double sided tape. FESEM micrographs clearly exhibit the presence of spindle shaped CuO nanostructures. Minimum thickness of the structure was found to be 26.7 nm and the maximum thickness was found to be 54.4 nm. Minimum length of the structure was found to be 89.3 nm and the maximum length was found to be 194.0 nm. The composition of the CuO powder was further analyzed by EDAX analysis. EDAX spectrum presented in FIG. 3 also shows the presence of Cu and $O_2$ confirming that the synthesized material is CuO.

Figure 4:
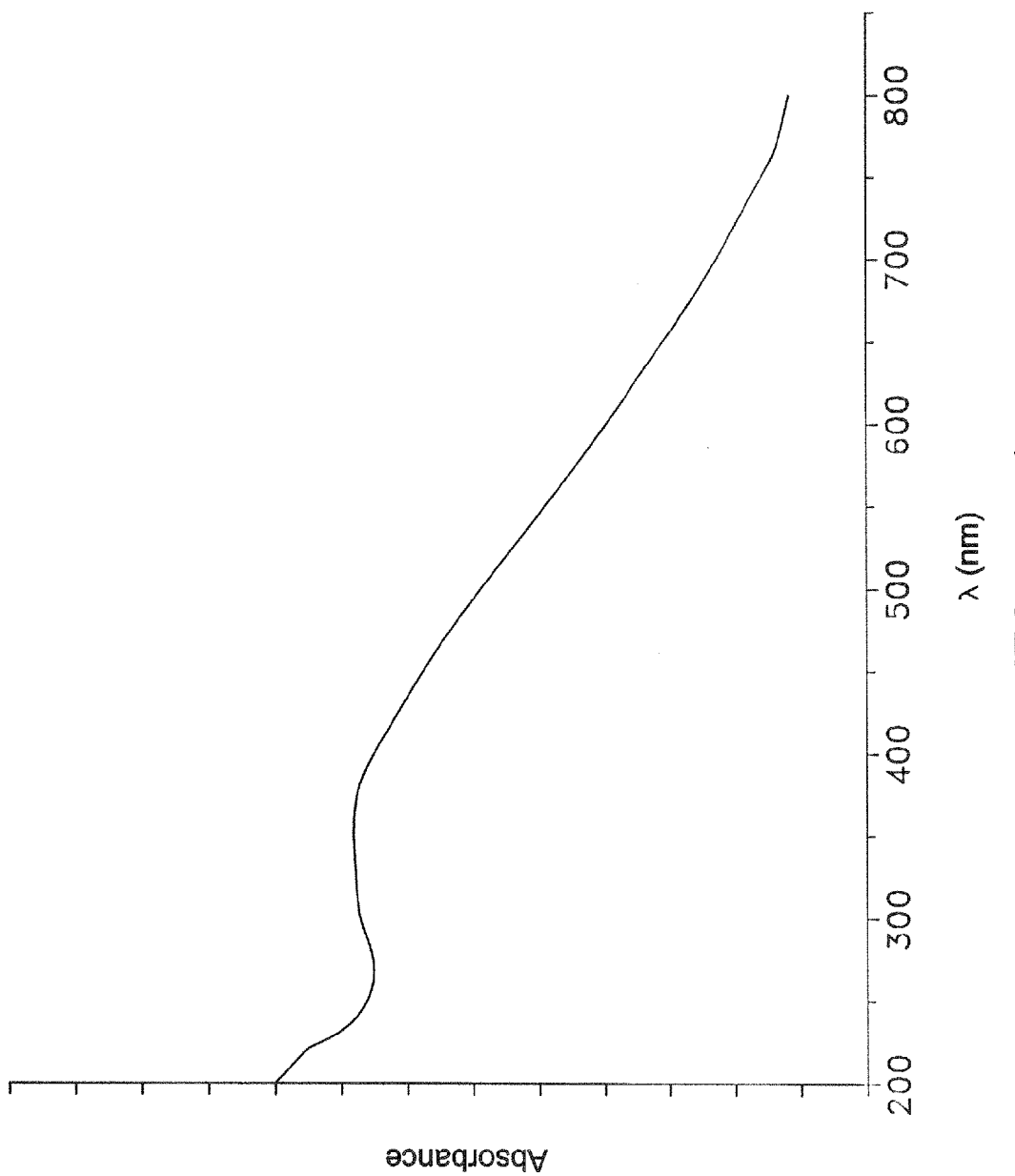
FIG. 4 is UV-VIS spectrum of CuO nanopowder.

UV-Visible absorption spectroscopy is an important tool to investigate the optical properties of semiconducting nanoparticles. The absorption spectrum of CuO nanoparticles is shown in FIG. 4. It exhibits an absorption edge at around 350 nm which is greater than absorbance for bulk CuO which is 310 as reported by Zhang et al.

Figure 5:
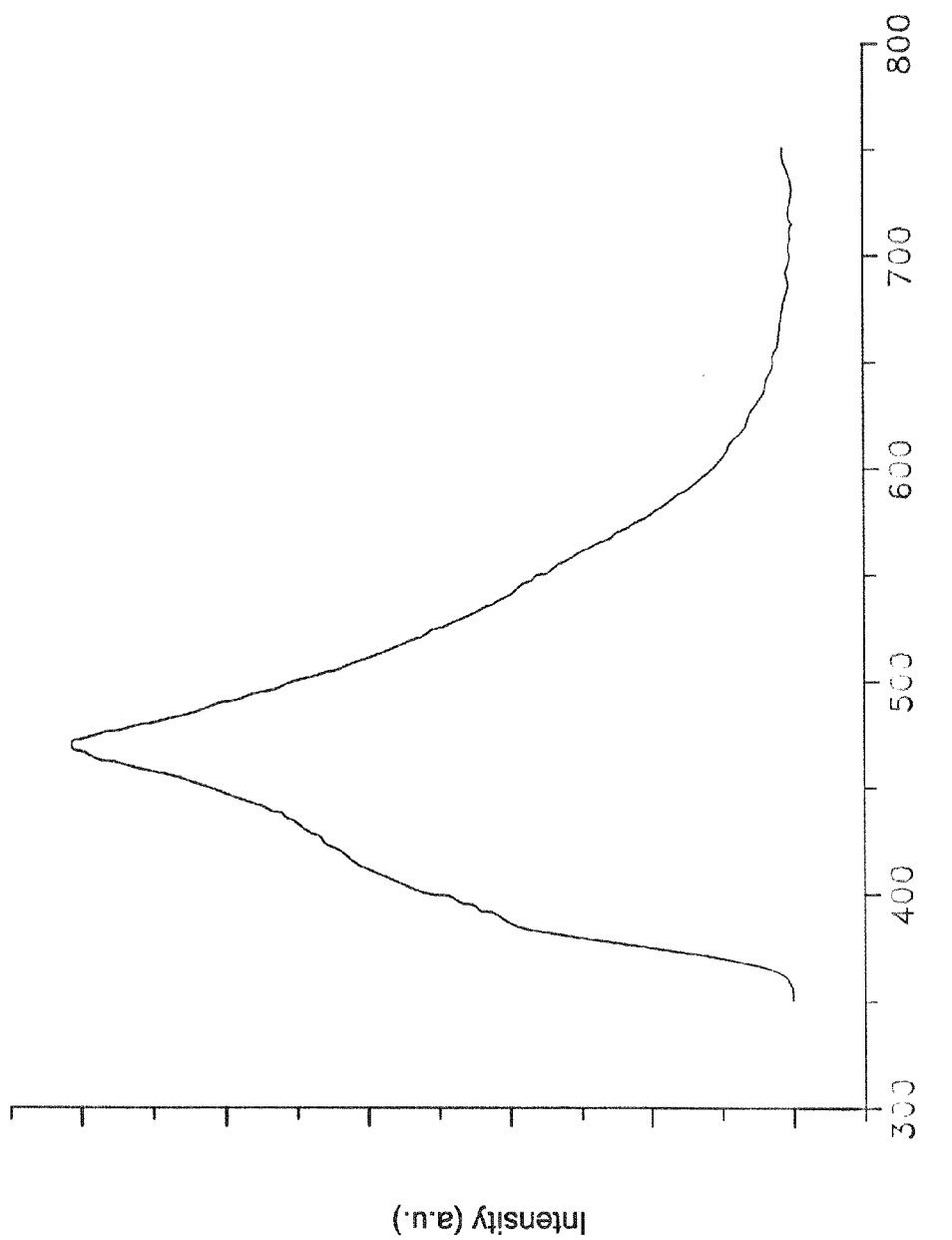
FIG. 5 is PL spectrum of CuO nanopowder.

FIG. 5 presents the room temperature photoluminescence (PL) behavior of CuO nanoparticles which was investigated using fluorescence spectrophotometer at an excitation wavelength of 325 nm. It is clear from PL spectra that the samples exhibit two emission peaks. A weak emission band occurred in the UV region at 381 nm, while a sharp emission band is located at 470 nm (visible region). It is understood that the emission wavelength of the oxide material depends mostly on the particle's shape, size, and excitation wavelength. The first emission peak at 381 nm can be attributed to the band edge emission. The second peak, occurred in the visible region, can be assigned to the defects and vacancies generated due to non-stoichiometric CuO. It is believed that the non-stoichiometry is generated in CuO due to the existence of Cu vacancies.

Figure 6:
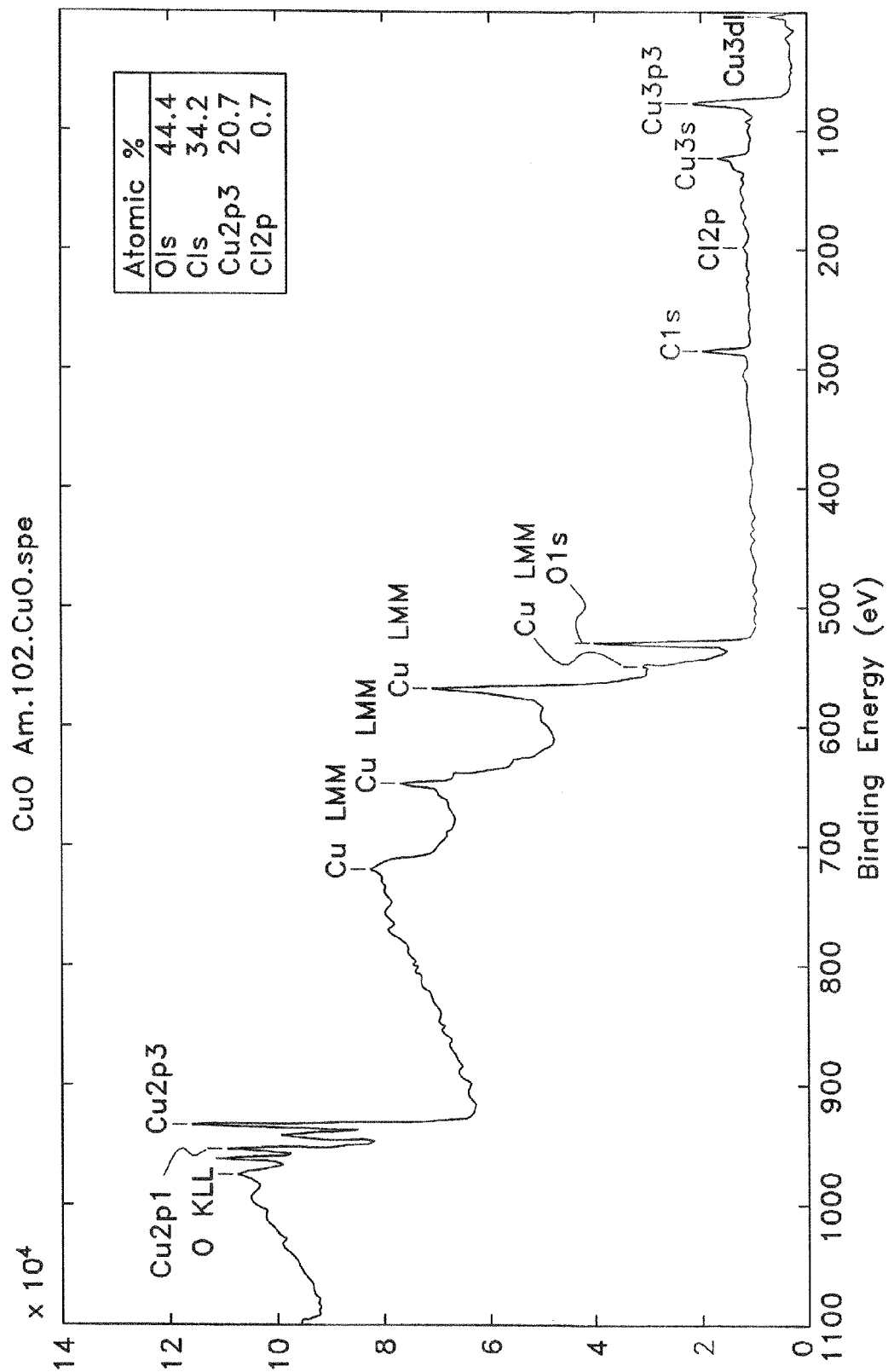
FIG. 6 is XPS of CuO nanopowder.

FIG. 6 shows the XPS survey scan of the sample which shows no impurity in the prepared sample confirming the high purity of the CuO nanopowder.

On the basis of the characterization done on the CuO nanopowder prepared using the present sonochemical method, it is concluded that the prepared sample consists of spindle shaped CuO nanostructures with high purity, as no impurity was detected.

It is to be understood that the present invention is not limited to the embodiments described above, but encompasses any and all embodiments n the scope of the following claims.

We claim:

1. A method for producing water dispersible CuO nanostructures, comprising:
    dissolving copper nitrate in deionized water to provide an aqueous copper nitrate solution;
    placing the aqueous copper nitrate solution in an ultrasonic bath at room temperature for 30 minutes;
    mixing ammonia with the copper nitrate solution to form precipitate;
    placing the precipitate in an ultrasonic bath to form black precipitate;
    washing the black precipitate; and
    drying the black precipitate to form CuO nanostructures, wherein the nanostructures are crystalline, spindle-shaped with thickness of about 26.7 nm to about 54.4 nm and a length of about 89.3 nm to about 194.0 nm.

2. The method for producing water dispersible CuO nanostructures according to claim 1, wherein a pH of the precipitate is adjusted to a level between about 9 and 12.

3. The method for producing water dispersible CuO nanostructures according to claim 1, wherein the black precipitate is washed with water and ethanol.

4. The method for producing water dispersible CuO nanostructures according to claim 1, wherein the black precipitate is dried in an oven at about 80° C. for about 24 hours.

5. The method for producing water dispersible CuO nanostructures according to claim 1, wherein the nanostructures are dispersible in water.

6. A method for producing water dispersible CuO nanostructures, comprising:
    dissolving copper nitrate in deionized water to provide an aqueous copper nitrate solution;
    placing the aqueous copper nitrate solution in an ultrasonic bath;
    mixing ammonia with the copper nitrate solution to form a precipitate;
    placing the precipitate in an ultrasonic bath to form a black precipitate;
    washing the black precipitate; and
    drying the black precipitate to form CuO nanostructures, wherein the nanostructures are crystalline, spindle-shaped with a thickness of about 26.7 nm to about 54.4 nm and a length of about 89.3 nm to about 194.0 nm.

* * * * *